United States Patent

Johnson

[15] 3,687,034
[45] Aug. 29, 1972

[54] EXPOSURE CONTROL MECHANISM WITH MECHANICAL FLASH SYNCHRONIZATION

[72] Inventor: Bruce K. Johnson, Andover, Mass.
[73] Assignee: Polaroid Corporation, Cambridge, Mass.
[22] Filed: June 29, 1970
[21] Appl. No.: 50,583

[52] U.S. Cl. ............................................. 95/11.5 R
[51] Int. Cl. ............................................. G03b 15/04
[58] Field of Search ....... 95/11 R, 11 L, 11 P, 11.5 R; 240/37.1; 431/93

[56] References Cited

UNITED STATES PATENTS

| | | | |
|---|---|---|---|
| 3,576,156 | 4/1971 | Michatek | 95/11.5 R |
| 3,576,155 | 4/1971 | Beach | 95/11.5 R |
| 3,528,353 | 9/1970 | Colville | 95/11 R |
| 3,544,250 | 12/1970 | Beach | 431/93 |

*Primary Examiner*—Samuel S. Matthews
*Assistant Examiner*—Fred L. Braun
*Attorney*—Brown and Mikulka, William D. Roberson and Gerald L. Smith

[57] ABSTRACT

An exposure control mechanism utilizing a singular shutter blade which is drawn by an actuator arm from a blocking position to an unblocking position to initiate an exposure interval. The actuator arm is spring loaded with the depression of a shutter release lever which moves it into engagement with the shutter blade to draw it to its unblocking position. During this movement of the actuator, an impulse actuator is spring loaded and selectively released from an initial position to accelerate along a given rotational path to strike a probe member which is then extended into a percussively ignited flashlamp assembly. The impulse actuator and probe are returned to their initial positions in conjunction with the actuator arm movement of the shutter blade to its unblocking position.

28 Claims, 13 Drawing Figures

Patented Aug. 29, 1972 3,687,034
8 Sheets-Sheet 1

INVENTOR.
BRUCE K. JOHNSON

Patented Aug. 29, 1972 3,687,034

INVENTOR.
BRUCE K. JOHNSON
BY Brown and Mikulka
and
Gerald L. Smith
ATTORNEYS

Patented Aug. 29, 1972

INVENTOR.
BRUCE K. JOHNSON
BY Brown and Mikulka
and
Gerald L. Smith
ATTORNEYS

Patented Aug. 29, 1972

INVENTOR.
BRUCE K. JOHNSON
BY Brown and Mikulka
and
Gerald L. Smith
ATTORNEYS

Patented Aug. 29, 1972

INVENTOR.
BRUCE K. JOHNSON
BY Brown and Mikulka
and
Gerald L. Smith
ATTORNEYS

INVENTOR.
BRUCE K. JOHNSON

Patented Aug. 29, 1972

INVENTOR.
BRUCE K. JOHNSON
BY Brown and Mikulka
and
Gerald L. Smith
ATTORNEYS

EXPOSURE CONTROL MECHANISM WITH MECHANICAL FLASH SYNCHRONIZATION

BACKGROUND OF THE INVENTION

Packaged multiple flashlamp assemblies have been developed incorporating a mechanical ignition feature. Ignition of an individual flashlamp is effected by inserting a probe or the like through openings formed within the base supporting structure of an assembly. Each flashlamp within an assembly is formed having a glass envelope within which is contained the usual shredded, ignitable zirconium foil or an equivalent substitute. Communicating with the foil through the glass envelope is a hollow deformable base which contains a percussive material. By striking and deforming the base with a spring loaded firing pin, the percussive material thermally reacts and particles therefrom are caused to travel upwardly through the base and ignite the shredded oil. The firing pin is resiliently preloaded against a restraining element during fabrication of the multi-lamp assembly. To cause its release to fire a corresponding flashlamp, the earlier described probe is inserted through an assembly base opening into contact with an appropriate firing pin. By applying sufficient pressure from the probe, the firing pin is released from engagement with the restraining element to strike and deform the flashlamp base.

While advantageously eliminating a need for the presence of flash igniting battery power supplies within a camera, the artificial illumination system provided by the mechanically ignited flashlamp is more difficult to synchronize with the operation of photographic shutters. Rather than merely providing an electrical switch to be lightly tripped in conjunction with shutter blade movement, exposure control mechanisms contemplated for use with the mechanically fired flashlamps must physically move a probe element reciprocally into and out of the flashlamp assembly. Movement of the probe into engagement with the flashlamp firing pin requires forces from springs or the like which are relatively high when compared with the spring force requirements of conventional shutters. Further, the probe element must be released for movement under this rather heavy spring load at a proper instant synchronized with shutter blade movement and must move at a determinable velocity to achieve flashlamp ignition at a proper point in time within an exposure interval.

The heavier spring loads required for actuating the firing or probe elements are readily derived through stronger springs wound from film advance mechanisms. For instance, the manually derived motion from an advance mechanism may be "tapped" to load or wind a spring for driving a flashlamp igniting system. Where an exposure mechanism is intended for use in cameras which do not incorporate such film winding mechanisms, however, this convenient source of spring loading power is not available. Typically, such mechanisms are required for use in photographic cameras of the self-developing type in which film processing takes place as an adjunct to its exposure.

Exposure mechanisms utilized with the more popularly priced versions of such cameras should be self-cocking and formed of a minimum number of easily fabricated parts. Because the flashlamp assemblies are typically packaged in cubic form and must be rotated to position individual flashlamps in proper orientation for each exposure, the movement of the probe or firing element must be controlled to provide for its extension into the flashlamp assembly and retraction therefrom before a camera operator manually releases a shutter release latch or element. As a consequence, the shutter mechanism must provide a form of reciprocatory motion early in an exposure cycle in order to derive a necessary mechanical logic to control the probe element.

Another characteristic of the flashlamps now discussed resides in their relatively rapid build-up to peak illumination intensity when fired. For instance, conventional flash cube assemblies reach peak intensities of illumination output about 12 to 13 ms. following ignition. In contrast, however, the mechanically ignited flashlamp assemblies typically reach such peaks within about 7 ms. This shortened interval between ignition and peak output, when considered in light of the mechanical requirements for igniting the flashlamps, poses a design requirement for a highly accurate coordination between shutter release and flash ignition.

Another feature desired in exposure control mechanism design is that of minimizing the amount of spring force required to be overcome in manually depressing a shutter release latch. Generally, acceptable release forces can be achieved where all springs within the mechanisms undergo extension when a shutter release button is depressed. The shutter release actuation force becomes much greater should the force of one spring be transferred to load another during the winding down operation of a shutter.

Where the pre-packaged flashlamp assemblies assume a cubic form which must be rotated between exposures, additional spring loading requirements are imposed upon exposure mechanism designs. As discussed above, the mechanical motion available from film winding mechanisms is often utilized to wind springs which are subsequently tripped to run down and rotate the cubic flashlamp assemblies. Should a film winding or advancing mechanism not be available with the camera, clock springs or the like in combination with escapement mechanisms may be provided to incrementally rotate the cubes. The latter clock springs must be manually wound through the flash cube as a preliminary step in preparing the camera to make a series of exposures. For purposes of convenience on the part of the camera operator, it is desirable to eliminate such additional preparatory steps to the making of a photographic exposure. Further, escapement mechanisms or the like which serve to control the rotation of flash cube rotating systems are subject to wear and, consequently, pose undesirable product design problems.

SUMMARY OF THE INVENTION

The present invention is addressed to an exposure control mechanism which provides highly efficient shutter operation in conjunction with an arrangement for synchronously firing flashlamps of a mechanically ignitable variety. Mechanical ignition of the flashlamps is achieved under acceptable loading forces generated by the manual depression of the shutter release member. As a consequence, the exposure apparatus of the invention may be utilized within a broader spectrum of photographic systems.

Energy stored by the exposure mechanism during the depression of a shutter release member is controlled through a unique mechanical logic which imparts reciprocatory motion to a flash igniting probe member. This member is urged into firing contact with the firing pin of a flashlamp assembly and is retracted to a position without the flashlamp assembly before a camera operator's finger is removed from a shutter release element. To exert sufficient and relatively high force through the firing probe while maintaining reasonable spring loading force requirements for the entire exposure mechanism, the mechanism incorporates an impulse actuator arrangement in the form of a firing arm. This firing arm is spring loaded during the depression of a manually actuated shutter release member and, during such loading, is retained in an orientation selectively displaced from its point of contact with the above noted firing probe. When released in synchronism with the actuation of shutter elements, the impulse actuator is accelerated toward its point of contact with the firing probe to impart a momentum thereunto sufficient to readily overcome the resistive resilience of a flashlamp firing pin.

Synchronization between the impulse actuator element and the operation of the shutter of the exposure mechanism is achieved through a temporary mechanical union of the impulse actuator with the shutter just prior to the initiation of an exposure interval. The impulse actuator or firing arm is operative to return the probe element to its retracted position during the exposure initiation movement of the associated shutter of the exposure mechanism. As a consequence, an associated multi-lamp flashlamp assembly can be moved from one operative position to another conveniently without interference from mechanical firing elements.

As another feature of the invention, an advancing element of the exposure mechanism is provided which serves to cause the indexing of individual flashlamps within an assembly thereof to move from one operative position to another following each exposure interval. This advancing member serves a second important function of regulating the actuation or release of the above noted impulse actuator member during the initial depression of a shutter release element. The advancing member is drawn to a position of engagement with a flashlamp assembly mounting mechanism during the initial depression of a shutter release member and is released from this position with the release of the shutter release member to cause a requisite indexing rotation of the flashlamp assembly following each exposure interval. A simple spring arrangement which is loaded during the initiation of an exposure is used to provide the force necessary to provide the indexing function, no separately wound or loaded springs being required.

As another feature and object of the invention, the exposure mechanism incorporates a shutter having a singular shutter blade which is reciprocally driven to define an exposure interval. The elements or components providing for this reciprocal motion are utilized to evolve the mechanical logic required to move the firing probe of the mechanism into and out of engagement with the firing pin of a flashlamp assembly. Mechanical cooperation between the components of the exposure mechanism is ideally achieved. For instance, the spring forces released during the actuation of the impulse actuator or firing arm not only impart motion to the probe element but also contribute forces aiding the opening of the shutter of the exposure mechanism. Further, by virtue of its contact with a shutter actuating arrangements during opening movement of the shutter elements, the impulse actuator of the mechanism contributes to the development of an adequately timed exposure interval.

An additional feature and object of the invention is to provide an exposure mechanism which is self-cocking, utilizing spring loaded, manually actuated elements. All springs within the mechanism are cooperatively loaded during a shutter actuation such that no one spring is tensioned or operated "against" another. The latter feature permits the mechanism to exhibit desirably lower shutter release pressures. Further in this regard, all spring assemblies within the exposure control mechanism are arranged to assume a rest status following their actuation to cause exposure. The latter feature eliminates any possible long term distortion which may be occasioned by the springs being loaded against plastic parts or the like, common in low cost, high volume photographic exposure mechanisms.

A further feature and object of the invention is to provide an exposure control mechanism for photographic cameras which exhibits consistent, efficient and accurate performance characteristics even though operated with flashlamps exhibiting significantly rapid illumination output rise-time characteristics.

As an additional feature and object of the invention, the instant exposure control mechanism is immune from abortively reacting to inadvertent partial manual depression of a shutter release member. A substantially full depression of such a release member is required by a camera operator before either the shutter mechanism or the flashlamp indexing assembly coupled therewith will cause the unblocking of an exposure aperture or the moving of a flashlamp.

Another object of the invention is to provide a highly efficient exposure control mechanism for the use with percussively ignitable flashlamps which is fabricable in high volume and low unit cost. In achieving this object, a shutter mechanism provides for the co-pivotal mounting of significant number of its components parts. Further, the mechanism of the invention is fully fabricable with only a minimal number of components.

Other objects of the invention will in part be obvious and will in part appear hereinafter.

The invention accordingly comprises the apparatus and mechanism possessing the construction, combination of elements and arrangement of parts which are exemplified in the following detailed disclosure.

DETAILED DESCRIPTION

In its preferred embodiment, the exposure mechanism of the invention incorporates a shutter assembly having a singular shutter blade, the rest position of which serves to wholly block the passage of light through an exposure aperture. An exposure interval is commenced by mechanically pivoting the singular blade away from its blocking position to a position wholly unblocking the exposure aperture. The exposure interval is terminated by releasing the now spring-loaded shutter blade and permitting it to return to its initial or rest position. A reciprocating movement of the shutter mechanism components during the initial portion of an exposure cycle are used to provide the mechanical logic required to move a probe element into firing engagement with a percussively ignitable flashlamp assembly. To impart adequate inertia to this probe element, an impulse actuator, spring loaded during initial shutter movement is selectively released for free accelerative travel toward a point of impact with the probe or firing element of the mechanism. Proper synchronization of this firing motion is achieved through selective engagement of the impulse actuator with an advancing arm, an additional function of which is to advance individual flashlamps into successive operative positions. When used with a cubic form of packaged flashlamp assembly, the exposure mechanism functions to sense the firing of a final flashlamp within the assembly, whereupon it automatically assumes a locked status preventing further actuation until the removal of the flashlamp assembly.

In the discussion to follow, the terms "clockwise" and "counterclockwise" are used in a descriptive sense for the purpose facilitating an understanding of the operation of the mechanism as viewed within the referenced drawings. These terms are not used in limitation of the disclosure.

Figure 1:
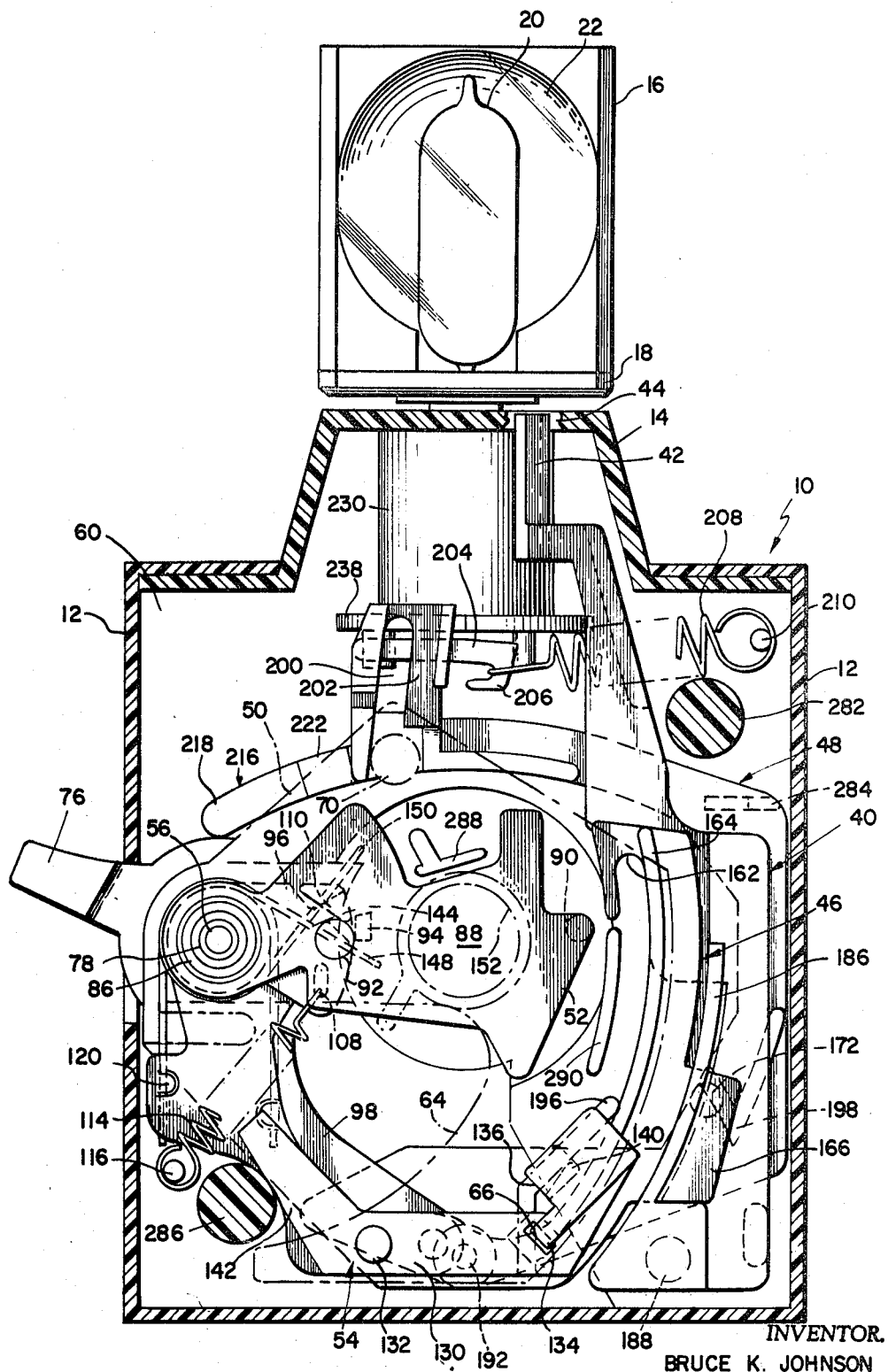
FIG. 1 is a front sectional view of the forward portion of a photographic camera showing an exposure mechanism according to the invention in a pre-exposure or rest orientation and having portions shown in phantom to reveal internal structure.

Referring to FIG. 1, a forward portion of the housing of a photographic camera is shown generally at 10. Housing 10 is formed having peripheral side walls 12 which are configured to support an elevated platform at 14. Platform 14 provides structural support for components of the exposure mechanism which detachably retain a multi-lamp flash assembly at 16. Looking additionally to FIG. 2, the assembly 16 is shown to comprise a packaged structure of cubic form having a base 18 upon which are supported four separate flashlamps as indicated at 20. Individual reflectors as at 22 are positioned cooperatively behind each of the lamps 20. Assembly 16 is rotated following each photographic exposure so as to position an unignited lamp 20 in an orientation to illuminate the photographic subject of a next sequential exposure.

Flashlamps 20 are formed having a glass envelope within which is contained the usual shredded ignitable metal foil. Communicating with this foil through the bottom portion of the glass envelope is a hollow deformable base 24 which contains a percussive material. Supported from cube base 18, the deformable cylindrical bases 24 are positioned to be percussively contacted by corresponding spring loaded firing pins as at 26. Firing pins 26 are resiliently pre-loaded against corresponding restraining elements 28 such that each is accessible through appropriate slots as at 30 formed within base 18. Ignition of a select flashlamp 20 is caused by mechanically lifting a spring member 26 from its engagement with a restraining element 28 such that the member 26 moves to percussively strike and deform base member 24. When deformed, base member 25 thermally reacts with percussive material contained therein to cause hot particles to travel upwardly through the base and ignite the shredded foil within the glass envelope of the lamp.

The function of mechanically releasing resilient firing pins 26 from restraining elements 28 to cause flash ignition is provided by a firing arrangement including a probe element illustrated generally at 40. Probe 40 is formed having a tip portion 42 which is configured for passing through an opening 44 within platform 14, thence through slot 18 within flashlamp assembly 16 to cause lamp ignition. As will be described in detail later herein, reciprocating motion is imparted to the probe element 40 by an arrangement including an impulse actuator or a firing arm shown generally at 46 and an advancing arm shown generally at 48. Components 40, 46 and 48 function in synchronism with the operation of the shutter assembly of the exposure mechanism.

Figure 3:
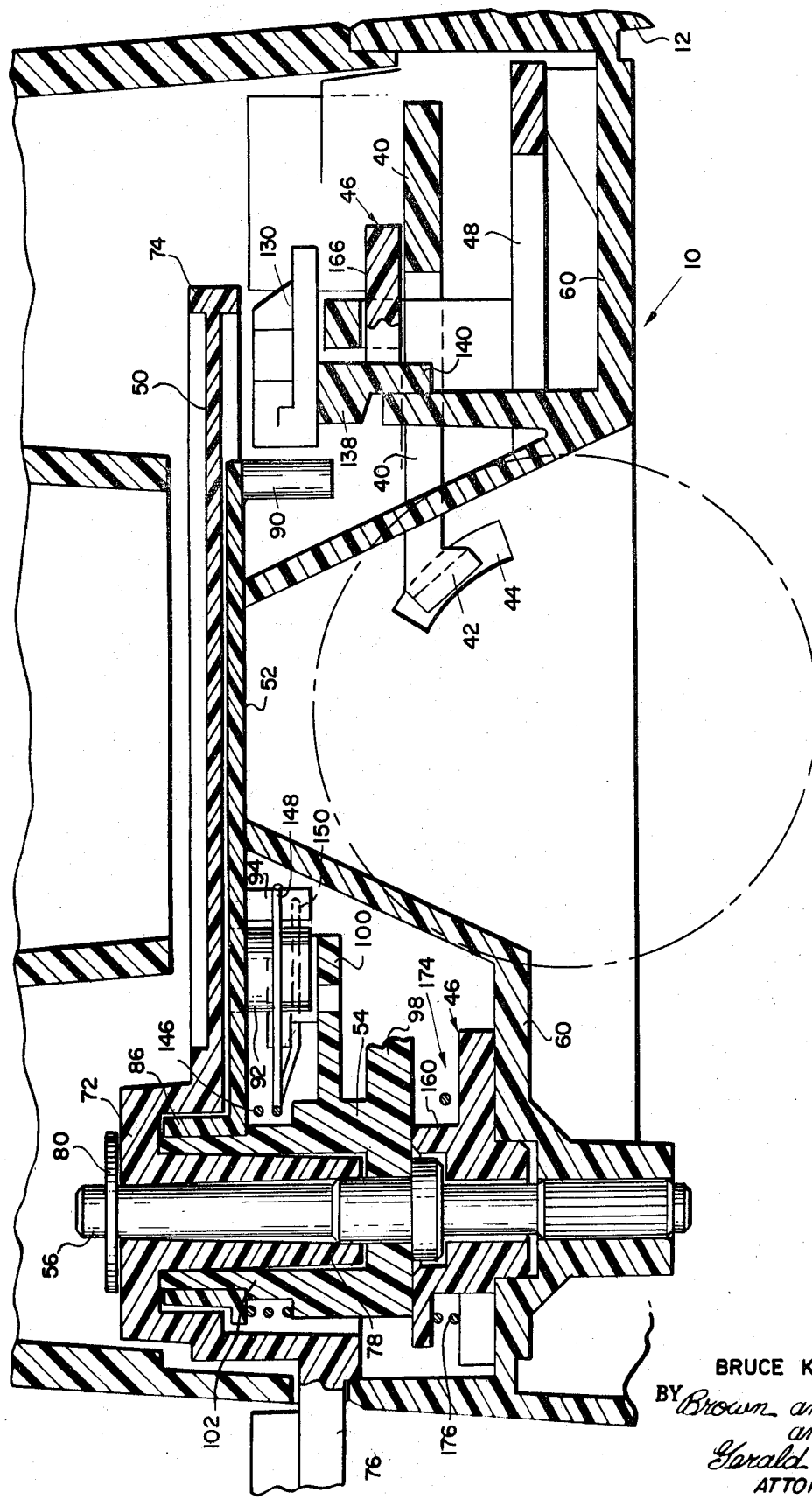
FIG. 3 is a sectional view taken transversely through the mechanism depicted in FIG. 1.
Figure 4:
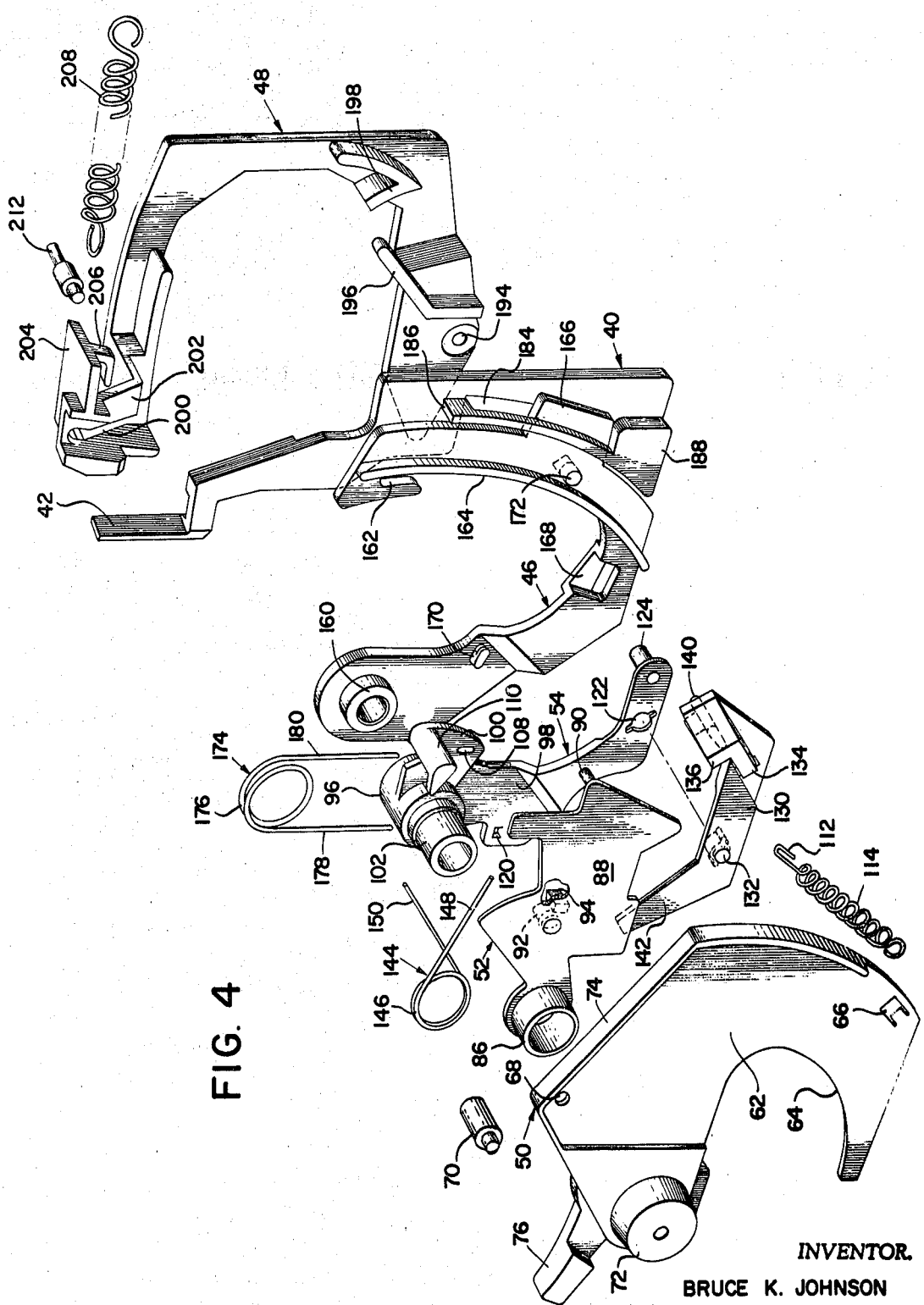
FIG. 4 is an exploded pictorial view showing components which combine to form the exposure mechanism of the invention.

Referring to FIGS. 1, 3 and 4, the shutter components of the exposure mechanism are shown to generally comprise a loading arm 50, a shutter blade 52 and an articulated shutter actuator assembly or power arm 54. The interaction of the shutter components provides a highly efficient and practical self-cocking shutter mechanism which is described and claimed in a co-pending application for United States patent by Bruce K. Johnson filed of even date herewith, entitled "self-cocking Photographic Shutter," Ser. No. 50,378 and assigned in common herewith. All of the above noted components of the shutter mechanism as well as impulse actuator 46 are pivotally mounted or journalled over a stud 56 which is fixed by staking or the like into a support structure 58 of a base plate 60.

Loading arm 50, shown in certain figures in phantom for clarity, is formed as a unitary, molded element having a thin blade portion 62 which functions as a leak plate or capping blade. Blade portion 62 is configured with a notched or indented portion, the periphery of which is indicated at 64. At a lower section of the arm 50 there is provided an engaging tab 66 depending inwardly toward base plate 60. Along the uppermost portion of the arm 50 there is provided an annular opening 68 within which is secured one end of a pin 70. Loading arm 50 is preferably formed of a plastic material opaque to light and, for purposes of the present invention, the arm 50 is structured and formed of a material selected to provide an amount of resilience permitting its flexure inwardly and outwardly about an integrally molded cylindrically shaped supporting portion 72. To regulate the amount of flexure of the arm about its support 72, a rib portion 74 is formed along its uppermost periphery (FIG. 4). Supporting portion 72 additionally is formed incorporating a shutter release lever 76 and is configured having a central bearing shaft portion 78 which is journaled over stud 56 and is rotated thereabout. Arm 50 as well as the components of the mechanism are held upon shaft 56 by locking ring 80 (FIG. 3).

Shutter blade 52 is pivotally mounted immediately behind loading arm 50. Blade 52 is formed of a material opaque to light and is configured having a cylindrical bearing assembly 86 which is journaled over and rotatable about the central bearing shaft 78 of loading arm 50. Blade 52 is designed having a planar blocking portion 88 and an inwardly extending cylindrical contact stud 90. Inwardly disposed from the blocking portion 88 is a cylindrical tab 92 and an aligning block 94.

Articulated shutter actuator assembly 54 is mounted on the inward side of shutter blade 52 and is configured having a dual component drive arm 96, one side 98 of which is displaced angularly and spacially from a spring powered side 100. Sides 98 and 100 are molded integrally with a cylindrical support bearing 102, the central opening within which is slideably journaled for rotation about central bearing shaft 78 of loading arm 50. Side 100 of drive arm 96 is formed incorporating a slot or opening 108 as well as an outwardly depending contact flange 110 having a teardrop cross-section. Drive arm 96 is biased for rotation in a clockwise or downward direction by virtue of the connection of slot 108 within side 100 with one end 112 of a helical spring 114. The opposite end of spring 114 is attached to a stud 116 extending from base plate 60.

Side 98 of drive arm 96 is formed having a spring retaining tab 120, an annular opening 122 having outwardly extending key ways formed therewith, and an inwardly depending cylindrical contact stud 124.

The articulated side 98 of drive arm 96 is configured to pivotally support a shutter latching member 130. Pivotal connection of member 130 to side 98 of drive arm 96 is provided by the connection of keyed pin 132 within latching member 130 with opening 122 in side 98. Slight rotation of member 130 provides a key locking arrangement between the components.

The outward tip portion of latching member 130 is formed as an outwardly extending engaging surface 134 adapted to contact engaging tab 66 of loading arm 50 in a rotatably driven relationship. The tip of latching member 130 is further configured having a shutter engaging latch surface 136 which, at an appropriate time during an exposure cycle, is operative to contact and engage with contact stud 90 of shutter blade 52. Extending inwardly from latch member 130 is a dual function camming element including a positional cam surface 138 and a regulating cam 140 (FIG. 3). Each of the cam surfaces 138 and 140 provide positional control over latching member 130 during an exposure cycle. The opposite end of latch member 130 is extended beyond pin 132 to provide a lever arm 142.

Positioned intermediate shutter blade 52 and articulated shutter actuator assembly 54 is a shutter blade return spring shown generally at 144. Spring 144 has a centrally disposed spirally wound portion 146 which is dimensioned and configured to slideably fit over central bearing shaft 102. One end, 148, of the spring is engageable with cylindrical tab 92 extending inwardly from shutter blade 52 and the opposite end, 150, is arranged to engage with contact flange 110 of dual component drive arm 96.

The shutter mechanism components thus far described are operative to cause the unblocking and blocking of an exposure aperture 152 through a technique of causing actuator 54 to engage shutter blade 52 and draw it from its aperture blocking rest orientation to a spring loaded orientation wholly unblocking aperture 152. Following an appropriate exposure interval, the blade 52 is released to return to a blocking or rest position to terminate an exposure interval. The mechanical motions achieving this shutter operation during an exposure cycle include a reciprocatory motion of articulated shutter actuator assembly 54. With the present invention, this reciprocatory movement is used to derive the requisite logic for causing probe element 40 to engage with and disengage from a flash assembly as at 16 to cause the ignition of a flashlamp as at 20.

Looking to FIGS. 1, 3 and 4, impulse actuator 46 is shown to be pivotally mounted upon stud 56 inwardly from articulated shutter actuator assembly 54. To provide for free rotational mounting, the impulse actuator or firing arm 46 is configured having a cylindrical bearing portion 160. From bearing 160, the arm extends in U-shaped fashion about aperture 152 to an opposite tip which is configured to form a slot 162. Extending downwardly from slot 162 is a reinforcing rib 164 and protruding outwardly from the ribbed reinforced portion of the arm is a tab 166. Within the lowermost portion of arm 46 is formed an open slot or indentation 168 and upwardly therefrom the arm is formed having a spring retaining bracket 170. A camming stud 172 extends from the rearward surface of the arm in the vicinity of tab 166.

Positioned intermediate impulse actuator or firing arm 46 and actuator assembly 54 is a driving spring shown generally at 174. Spring 174 has a centrally disposed spirally wound portion 176 which is dimensioned and configured to slideably fit over the cylindrical bearing portion 160 of impulse actuator 46. One end, 178, of spring 174 is engageable within spring retaining tab or bracket 120 extending inwardly from drive arm 96 and the opposite end, 180, of the spring is arranged within the apparatus to engage within bracket 170 of actuator 46.

The probe member 40 is inserted within the exposure mechanism in a manner permitting its slideable vertical movement. In addition to having an upwardly extending tip portion 42, the probe 40 is formed incorporating a vertically oriented elongate slot 184. Slot 184 is formed from a rib element 186 extending upwardly from an enlarged buttressing portion 188.

Advancing arm 48 is mounted for pivotal movement upon base plate 60 by a connection including a pin 192 (FIG. 1) extending through an opening 194 in the lowermost portion of the mechanism. Near the opening 194 the advancing arm is configured having an outwardly extending camming flange 196. Upwardly from flange 196, the advancing arm is structured to support a restraining cam 198. Arm 48 terminates in an engaging assembly configuration including a camming slot 200 the outwardly facing surface of which is formed as a ramp and which is adapted to receive the inwardly protruding portion of pin 70 extending from the loading arm 50. The configuration of the above noted ramp surface is illustrated more clearly in FIGS. 4 and 9 at 202. Extending inwardly from camming slot 200 is an engaging flange 204, the lower portion of which is formed to provide a hook 206. Advancing arm 48 is biased to move in a clockwise direction by a helical spring 208 extending between hook 206 and a stud 210 extending from base plate 60. Extending rearwardly from beneath engaging flange 204 is a cylindrical camming pin 212 the exposed end of which is slideable as a cam follower along the internal surface of a slot 216 formed within base plate 60. As shown more clearly in FIG. 9, slot 216 is formed having an inwardly disposed or lower level 218 and an outwardly disposed or upper level 220 separated by a ramp portion 222.

Figure 11:
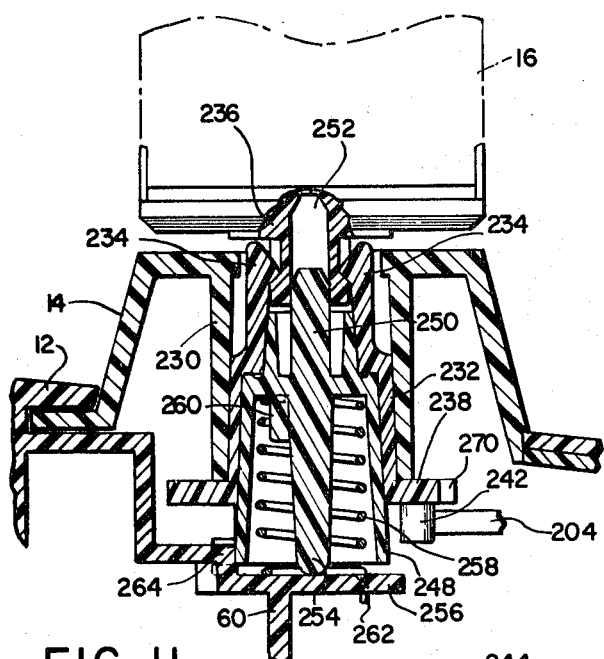
FIG. 11 is a front sectional view of the flashlamp advancing assembly shown in FIG. 1.
Figure 12:
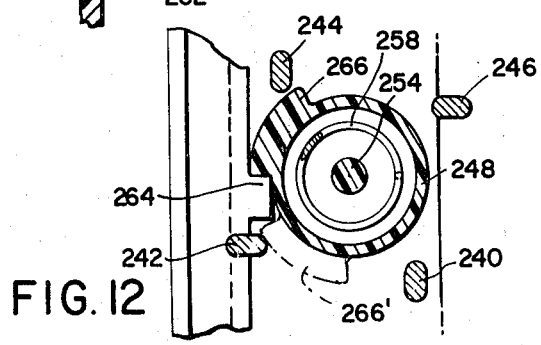
FIG. 12 is a top sectional view of the flashlamp advancing assembly of FIG. 1 with portions removed to reveal internal structure.

Referring to FIGS. 1, 11 and 12, the components making up the mounting assembly for supporting flash cubes as at 16 are illustrated. Extending inwardly from elevated platform 14 and molded integrally therewith is a fixed cylindrical housing 230. Housing 230 is hollow and is dimensioned and configured to rotatably support a dual carriage flashlamp engaging assembly. Looking to FIG. 11, the outermost of these carriages is shown at 232. Carriage 232 is formed as a cylinder having dimensions permitting it to slideably rotate within housing 230. Carriage 232 is configured supporting resilient gripping members 234 which are formed at their outermost tips to provide detents suited for gripping a post 236 extending downwardly from the base 18 of flash assembly 16. The lower portion of carriage 232 is formed as an outwardly extending annular flange 238. Flange 238 serves to support four downwardly protruding pins 240–246 which function in conjunction with advancing arm 48 to cause rotation of the flash assembly 16. Positioned within carriage 232 is an inner carriage 248 which is independently rotatable. The inner carriage 248 is configured having central post, the upward extension 250 of which is configured having a square cross section which is slideable within the hollow rectangular interior 252 of flash assembly post 236. When engaged as shown in FIG. 11 upon the post 236 of flash assembly 16, outer carriage 232 and inner carriage 248 become mechanically coupled and co-rotatable. When flash assembly 16 is removed from the mounting, carriages 232 and 248 are mutually independently rotatable. The centrally disposed post of internal carriage 248 extends downwardly at 254 to rest in rotatable fashion against a platform 256 molded integrally with side walls 12 and back plate 60. Mounted within the internal carriage 248 is a helical spring 258, one end of which is coupled with carriage 248 at an integrally molded tab 260. The opposite end of spring 258 is connected to platform 256 at 262. Platform 256 extends rearwardly in step fashion to be integrally joined with portions of side walls 12. One portion of this step extension is configured to form a narrow stop member 264.

Looking to FIG. 12, inner carriage 248 is shown to additionally include an integrally molded tab 266 which is contractable with stop member 264 when the inner carriage is caused to rotate a select amount in either a clockwise or counterclockwise direction. The alternate extreme position of tab 266 is shown in phantom at 266′. A more complete description of the dual carriage mounting for flashlamp assembly 16 is provided in a co-pending application for United States patent by B. K. Johnson and D. H. Hendry, Ser. No. 50,379 entitled "Photographic Apparatus for Mounting a Multilamp Flash Unit," filed of even date herewith and assigned in common herewith.

Figure 8:
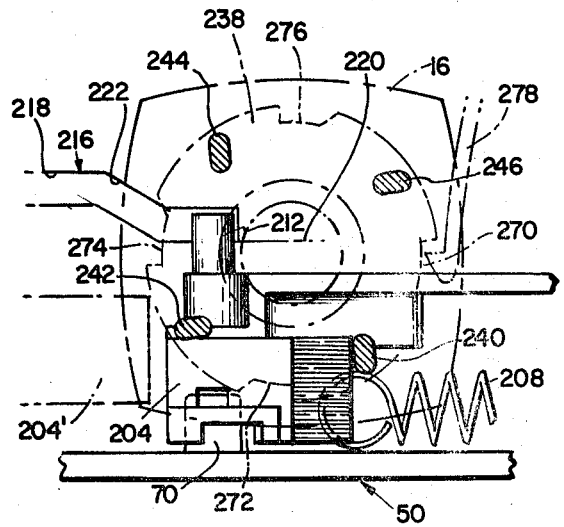
FIG. 8 is a top fragmentary view of the exposure mechanism of FIG. 1 showing the alternative orientation of certain of its components in phantom.
Figure 10:
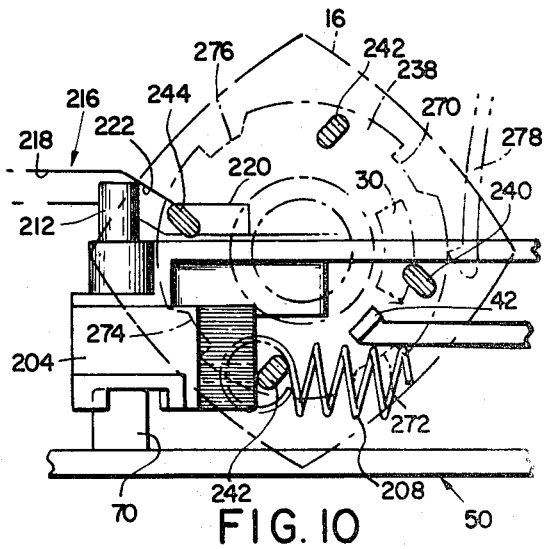
FIG. 10 is a top fragmentary view of the exposure mechanism of FIG. 1 showing the orientation of components thereof during the termination of an exposure cycle.

Turning additionally to FIGS. 8 and 10, an indexing arrangement for the flashlamp mounting assembly is illustrated more clearly. The assembly is simply formed, comprising selectively configured notches 270–276 fashioned within the periphery of rotating flange 238. Engageable with select ones of these notches is a resilient detent member 278. The detent member and notch assembly permits outer carriage member 232 to be rotated in a counterclockwise direction while assuring a proper operational orientation of each flashlamp 20 and its associated reflector 22 during ignition.

Referring to FIG. 1, the components of the exposure mechanism are illustrated as assembled and in a pre-exposure or rest orientation. In this orientation, a slight tensional force is exerted by spring 208 upon advancing arm 48, urging its rotation in a clockwise direction. Such movement is prevented, however, by virtue of the abutment of pin 212 extending inwardly therefrom with the terminus of slot 216. Inasmuch as advancing arm 48 is coupled through pin 70 with loading arm 50, the latter component is retained in the position shown wherein its blade portion 62 serves to prevent light leakage through aperture opening 152. Additionally, loading arm 50 causes shutter release lever 76 to assume an upward, pre-exposure position. To assure proper elevation of the advance arm 48 over the base plate surface 60, surface 60 supports a boss 284 over which the underside of the arm 48 may slide.

In its pre-exposure orientation, articulated shutter actuator assembly 54 is retained in a downward position by the clockwise bias exerted by spring 114. Travel of the assembly 54 in a clockwise direction is limited by the contact of lever arm portion 142 of latch 130 with a boss 286 extending upwardly from base plate 60. Such contact urges the latch 130 to pivot about pin 132 in a clockwise direction. The degree of such pivoting is limited by virtue of the additional contact of an edge of side 98 of dual components drive arm 96 with the boss 286. Shutter blade 52 is biased for movement in a counterclockwise direction under a relatively low spring force exerted by spring 144. A contact between cylindrical tab 92 on blade 52 and contact flange 110 of drive arm 96 retains the blade 52 in a light blocking position slightly below an upstanding boss member 288 formed within base plate 60. During an exposure cycle, blade 52 will move into a secondary light blocking position wherein its upper edge abuts against boss member 288.

Impulse actuator or firing arm 46 is retained in its initial position as shown by virtue of a slight tension exerted by side 180 of spring 174 as well as by virtue of the contact of cylindrical stud 124 of actuator assembly 54 with slot 168 formed within its lowermost portion. The firing arm 46 is mounted within the exposure mechanism such that tab 166 extending from its outer periphery extends through vertically oriented slot 184 in probe 40. In the position shown, the lower portion of tab 166 is in engagement with the lower terminus of slot 184, thereby causing probe member 40 to assume a position wherein its tip 42 is retracted from engagement within flashlamp assembly 16. The upward travel of probe member 40 is limited by a boss 282 extending from base plate 60.

Base plate 60 also supports a mildly curved camming flange 290. Camming flange 290 may be integrally molded within the base plate 60 and is spaced slightly outwardly from the outer rotational periphery of loading arm 50. The flange 290 will be seen to provide positional control for latch 130 during the initiation of an exposure cycle.

Turning to FIG. 8, the pre-exposure orientation of the flashlamp assembly mounting arrangement is depicted. In this orientation, loading arm 50 exerts inward pressure through pin 70 against advancing arm 48 in the vicinity of engaging flange 204. Additionally, the inward edge of engaging flange 204 is an abutment against pin 242 extending downwardly from flange 238 of carriage 232. Spring 258 of the inner carriage 248 biases flange 238 to move in a clockwise direction, which movement is restrained by virtue of the engagement of detent element 278 within notch 270.

OPERATION — FLASHLAMP IGNITION

FIG. 1 has been seen to illustrate the orientation of the components of the exposure mechanism in a pre-exposure status. When assuming this status, the components are slightly loaded, the springs supplying such loads being only slightly tensioned.

Figure 13:
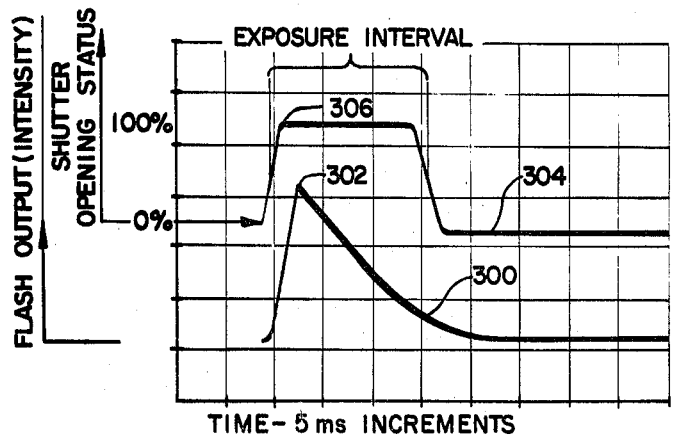
FIG. 13 illustrates superpositioned oscillators showing the time related output characteristics of flashlamps typically used with the present exposure mechanism and a related performance characteristic achieved with the present exposure mechanism.

Referring to FIG. 13, the operational speeds and synchronization criteria under which the instant exposure mechanism performs are illustrated. As discussed earlier, flashlamps of the variety discussed at 20 achieve their peak illuminational output relatively early in an exposure cycle, for instance, about 5 to 7 milliseconds following actuation. This characteristic of light output performance is illustrated by the trace 300 in the drawing. Note that the lamp output rapidly reaches its peak at 302 before falling off to gradual extinguishment. The opening characteristic of the shutter of the exposure mechanism is shown by the trace 304. A 100 percent opening or fully unblocking position of the shutter is achieved after about 3 milli-seconds. This fully open point in an exposure cycle is shown at 306. A mechanical synchronization of the shutter mechanism with mechanical ignition of the flashlamp is achieved through a unique interaction of the above-described mechanism component.

Figure 5:
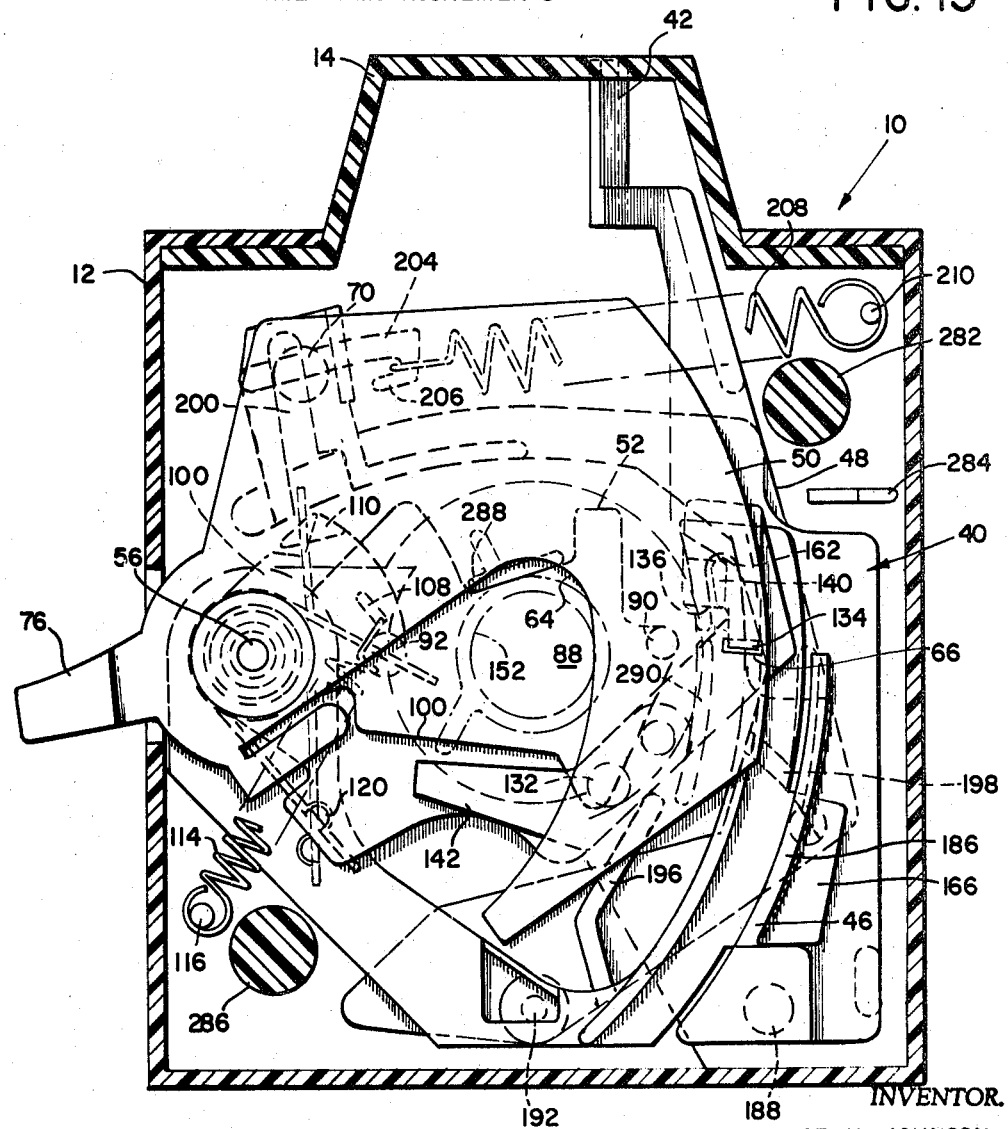
FIG. 5 is a front sectional view of the shutter mechanism of FIG. 1, showing an orientation of its components during an initial portion of an exposure cycle.

Referring to FIGS. 1 and 5, with the initial depression of shutter release lever 76, loading arm 50 will commence to rotate in a counterclockwise direction about stud 56. This counterclockwise movement is resisted to a controlled degree by a gradual tensioning of helical spring 208, the force from which is transmitted to loading arm 50 through its connection with advancing arm 48. By virtue of the latter connection, advancing arm 48 will commence to rotate in a counterclockwise direction about pin 192. As loading arm 50 rotates, its engaging tab 66 will commence to move in an arcuate path upwardly and into contact with outwardly extending engaging surface 134 of shutter latching member 130. As contact between engaging tab 66 and surface 134 is effected, the power arm or articulated shutter actuator assembly 54 will be caused to rotate in a counterclockwise direction. The position of shutter latching member 130 during this movement is maintained outwardly of the periphery of shutter blade 52. Control over the movement of the latching member 130 is provided by virtue of the sliding contact of its positional cam surface 138 (FIG. 3) first with camming flange 196 extending from advancing arm 48, and later with camming flange 290 extending from base plate 60. Transfer of positional cam surface 138 from camming flange 196 onto camming flange 290 is effected by virtue of the rotation imparted to advancing arm 48 coincidently with the movement of loading arm 50. As advancing arm 48 is rotated, camming flange 196 will align with flange 290 to permit transfer of positional cam surface 138 therebetween. Conjunctly with the rotational motion imparted to latch member 130 and its coupled dual component drive arm 96, contact flange 110 of arm 96 will rotate out of engagement with cylindrical tab 92 of shutter blade 52. As a consequence, an upper edge of blade 52 will ease into abutting contact with boss member 288 extending from base plate 60. Shutter blade 52 will remain in an aperture blocking orientation.

Loading arm 50 continues to cause the rotation of shutter actuator assembly 54 through its engagement of engaging tab 66 with surface 134 until positional cam surface 138 has reached and passed beyond the upward extremity of camming flange 290 and regulating cam 140 has moved into slot 162 of impulse actuator or firing arm 46. Referring to FIG. 5, the components of the mechanism are illustrated at this point in time during an exposure cycle. Note in the figure that spring 208 is about fully tensioned by virtue of the movement of loading arm 50. Spring 144 has been tensioned as a result of the rotation of articulated shutter actuator assembly spring powered side 100, while shutter blade 52 remains stationary. The latter stationary status is provided through the above noted abutting engagement of shutter blade 52 with boss 288. Helical spring 114, attached to side 100 of the shutter actuator assembly 54 has been tensioned to impart an operational bias thereupon urging rotation in a clockwise direction.

During the above noted rotational movement of loading arm 50, articulated shutter actuator assembly 54 and advancing arm 48, impulse actuator 46 remains stationary. The restraint of impact actuator 46 is achieved by virtue of a sliding contact of pin 172 extending inwardly therefrom with the surface of restraining cam 198 extending from advancing arm 48. The impact actuator 46 being thus retained at its initial position, driving spring 174 is loaded or tensioned by virtue of its connection with rotating articulated shutter actuator 54. It may be noted that during the foregoing initial portion of an exposure cycle, all essential springs within the system are simultaneously loaded and no one spring is tensioned against another.

As indicated earlier, an important feature of the exposure mechanism of the invention resides in its ability to cause shutter blade 52 to fully open before substantial light output intensities are reached by a flashlamp. The necessary mechanical synchronization required to achieve this performance criteria is provided by the operation of the impulse actuator 46 at this juncture in the operation of the exposure mechanism.

Figure 2:
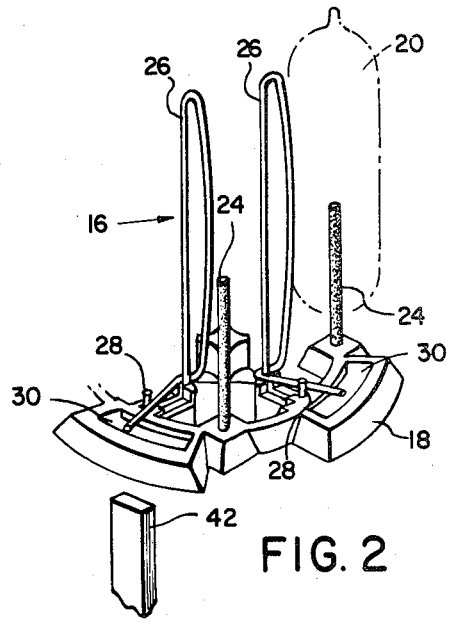
FIG. 2 is a fragmentary pictorial view of a flashlamp assembly which may be used with the exposure mechanism of the invention.

In the orientation of components shown in FIG. 5, impulse actuator 46 is spring loaded and restrained by virtue of the contact of its camming pin 172 with restraining cam 198. Additionally, articulated shutter actuator assembly 54 is spring loaded and latch member 130 is in a position which will permit its rotation into an orientation wherein engaging latch surface 136 is movable into engagement with cylindrical contact stud 90 of shutter blade 52. However, because of the insertion of regulating cam 140 of latch 130 within slot 162 of impulse actuator 46, the above-described shutter blade 52 engagement is controlled by the rotational position of impulse actuator 46. The stationary status of impulse actuator 46 is retained only as long as its camming stud 172 is in abutment against restraining cam 198 of advancing arm 48. As advancing arm 48 reaches its terminal position at the full depression of shutter release lever 76, this contact is released to permit impulse actuator 46 to rotate rapidly in a counterclockwise direction. As impulse actuator 46 accelerates and begins translation, slot 162 is removed from its position capturing regulating cam 140 and, as a consequence, latch 130 will commence to rotate to a position permitting the contact of its engaging surface 136 with contact stud 90 of shutter blade 52. This movement occurs because the described arcuate motion of tab 66 acts to transfer pivoting force into latch 130. As impact actuator 46 continues its accelerative rotation, its tab 166 moves upwardly through slot 184 in probe member 40. When tab 166 reaches the upper terminus of slot 184, it impacts with the probe 40 and drives the latter into its extended orientation. As a consequence, the tip portion 42 of the probe 40 is urged into firing engagement with a flashlamp spring loaded firing pin 26 (FIG. 2). Upward travel of probe member 40 is limited by its contact with boss 282.

Figure 6:
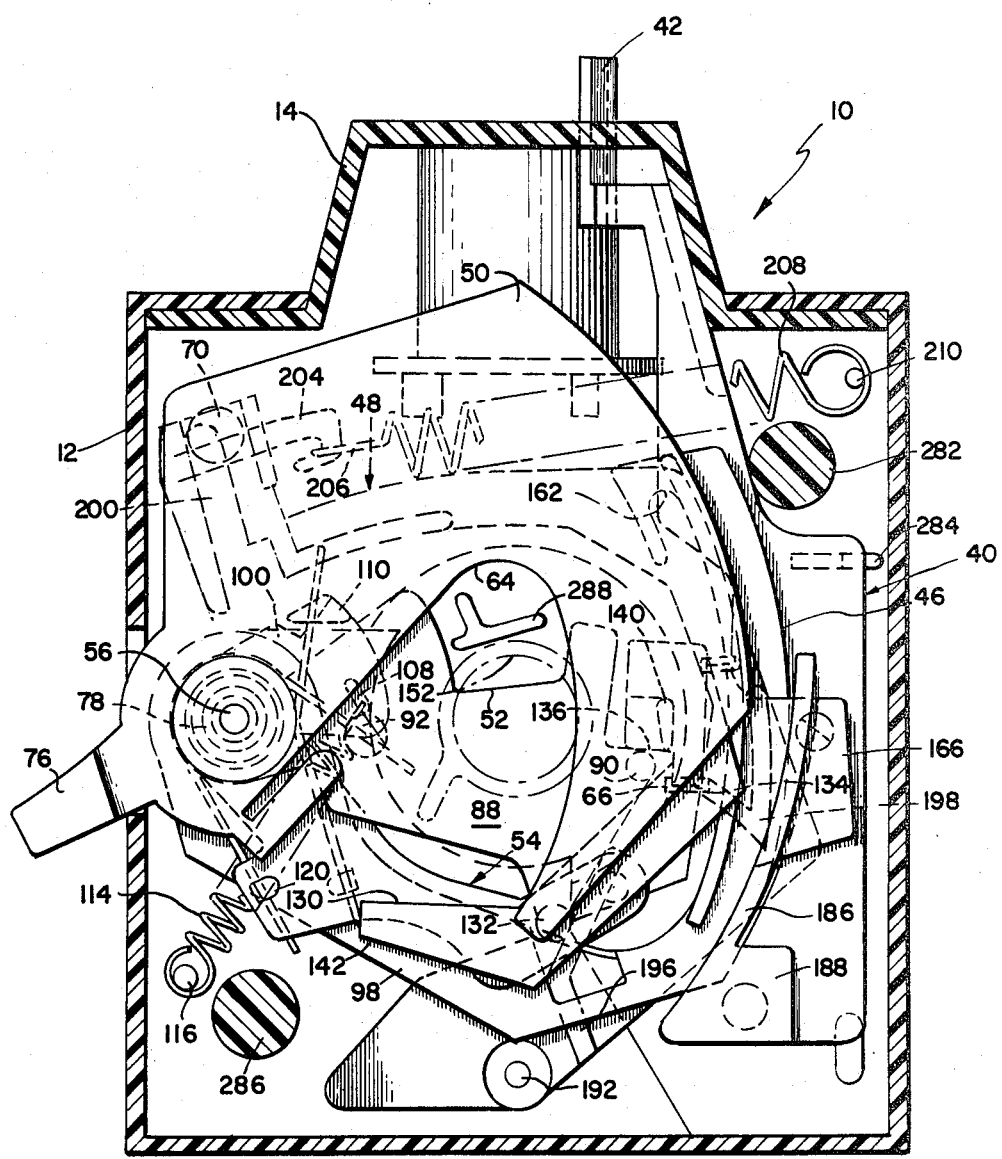
FIG. 6 is a front sectional view of shutter mechanism of FIG. 1, showing the orientation of its elements during the initiation of an exposure interval.

Looking to FIG. 6, the orientation of components of the exposure mechanism during this initiation of an exposure interval is illustrated. For instance, latch member 130 is shown in engagement with shutter blade 52 and the rotational bias mainly exerted by spring 114 is causing the blade 52 to be drawn to a light unblocking position. Clockwise opening motion of the articulated shutter actuator assembly 54 is enhanced by the releasing force of driving spring 174. For instance, spring 174 is connected between the articulated shutter actuator 54 and impact actuator 46. As the impact actuator 46 is moving upwardly in a counterclockwise direction and actuator assembly 54 is moving downwardly or in a clockwise direction, driving spring 174 is releasing energy between them. A resulting opening impetus is thereby realized at the shutter during the initiation of an exposure interval. At this juncture in the exposure cycle, all mechanical contact with the hand actuated loading arm 50 by associated components of the assembly is withdrawn. As a result, the exposure producing operation of the mechanism is immune from variations in actuation pressures or speeds imposed upon shutter release lever 76.

As positional cam surface 138 and regulating cam 140 of latch 130 move downwardly while engaged with shutter blade 52, they are positioned inwardly on camming flanges 290 and 196. As the shutter blade 52 rotates in a clockwise direction, spring 144 remains substantially fully tensioned. This tensioning results from its slideable mounting upon support bearing 102 and the absence of any relative movement between the shutter blade 52 and articulated shutter actuator assembly 54.

As the shutter blade 52 is rotated downwardly to cause the initiation of an exposure interval, cylindrical stud 124 extending inwardly from side 98 of drive arm 96 will move into abutting engagement with cavity or indentation 168 within impact actuator 46. Contact between these elements is made when shutter blade 52 has been drawn to a position representing a substantially 100 percent unblocking of aperture 152. The contact between the components causes impulse actuator 46 to be driven in a reverse or clockwise direction towards its initial position. As impulse actuator 46 rotates downwardly, its extending tab 166 strikes the lower terminus of slot 184 of probe 40 causing the tip portion 42 thereof to be withdrawn from flashlamp assembly 16. As a consequence, probe 40 returns to its retracted position.

Downward or opening rotation of shutter blade 52 and shutter actuator assembly 54 continues through a fully unblocking position beneath the periphery of aperture 152 until the lever arm 142 of shutter latching member 130 moves into contact with boss or stop member 286. With the latter contact, latching member 130 is caused to rotate in a clockwise direction about pin 132 to cause the disengagement of latch surface 136 from contact stud 90 of shutter blade 52.

Figure 7:
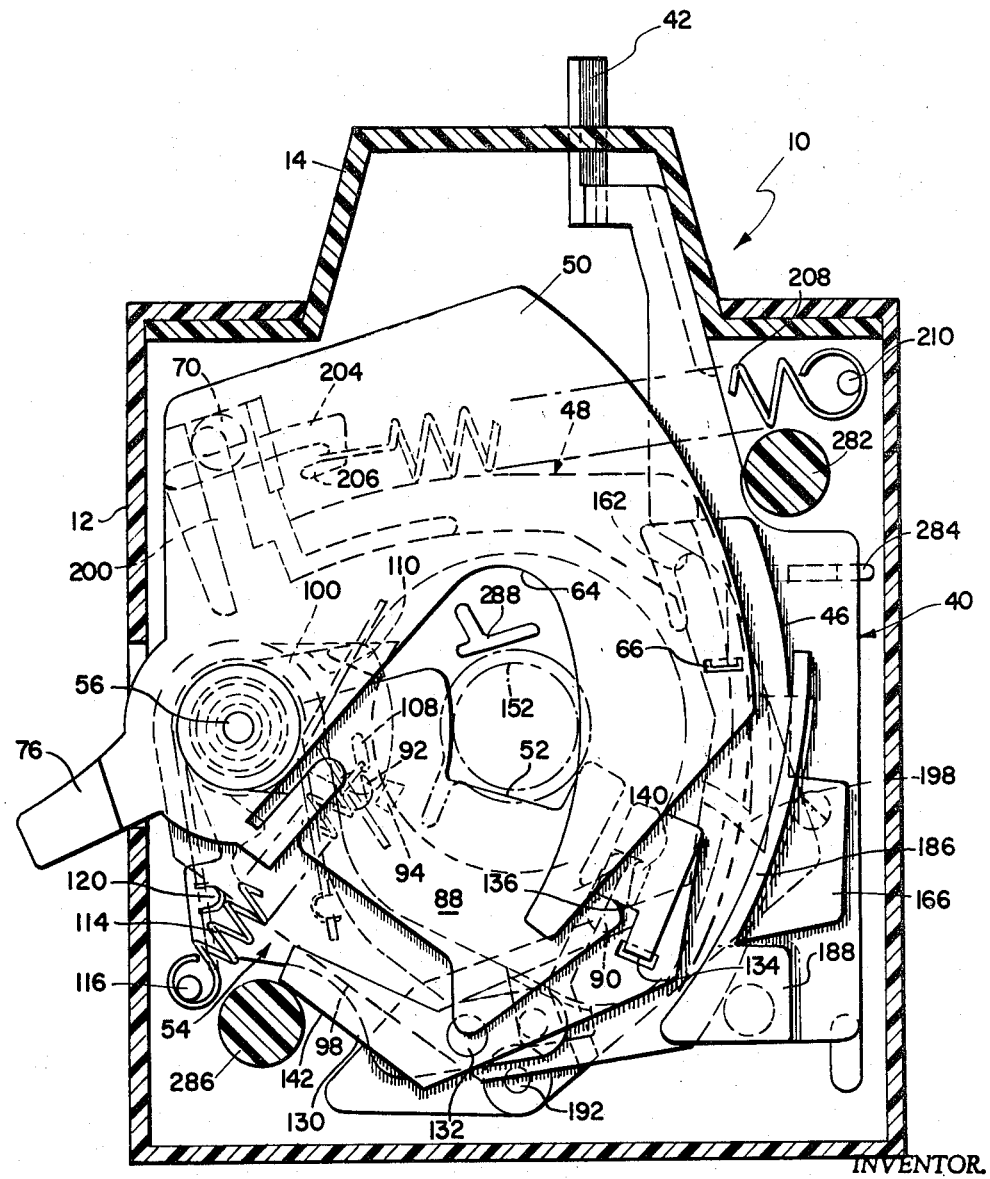
FIG. 7 is a front sectional view of the shutter mechanism of FIG. 1.

The above discussed contact of stud 124 of drive arm 96 with impulse actuator 46 provides for a control over the length of time shutter blade 52 is caused to dwell in a fully unblocking position. Blade 52 will not be released until pivot arm 142 of latch 130 makes contact with boss 286. The restraining momentum imposed by impulse actuator 46 and probe member 40 during this return movement provides an adjustable amount of delay which may be used for extending the interval of an exposure. Adjustment of this extension is readily effected by maneuvering the point of contact of stud 124 with the bottom of indentation or open slot 168 as well as by adjusting either the length of slot 184 in probe 40 or the width of tab 166. The orientation of the mechanism as latch pivot arm 142 approaches contact with boss member 286 and probe 40 is being withdrawn into its retracted position is depicted in FIG. 7.

From the foregoing, it may be observed that both the extension and retraction of the probe member 40 occurs both prior to and during the initiation of an exposure interval. The reciprocatory motion imparted to probe member 40 occurs in conjunction with an upward motion of the articulated actuator assembly 54 upon depression of shutter release lever 76, while retracting motion of the probe member 40 accompanies a downward motion of the shutter blade 52 and cooperating mechanisms. As a consequence, the probe tip portion 42 is removed from engagement with the flash assembly 16 well before the termination of an exposure.

With the pivoting of latch 130 about pin 132, shutter blade 52 is released under the bias of spring 144 to a position wherein its inwardly extending cylindrical tab 92 re-engages contact flange 110 of dual component driving arm 96. Note in this regard that this contact is realized inasmuch as the articulated actuator assembly 54 has returned to its rest position at the initiation of an exposure interval. Upon striking contact flange 110, the shutter blade 52 motion is brought to a halt and "damped" in a fashion minimizing blade "bounce" or the like. This slight damping action is permitted inasmuch as the upper edge of blade 52 is slightly displaced from boss member 288 when in a pre-exposure orientation as shown in FIG. 1. In the latter figure, the shutter blade 52 position is one wholly blocking the aperture 152.

Note that exposure terminating movement of shutter blade 52 also takes place in complete isolation from any spurious dynamic influence occasioned by manually exerted pressure upon shutter release lever 76. Following the exposure producing operation described above, lever 76 is released to permit loading arm 50 to pivot under the loading of spring 208 into the pre-exposure orientation described earlier in connection with FIG. 1. As loading arm 50 resumes its initial orientation, its blade portion 62 provides additional covering of aperture opening 152, thereby serving the leak plate function discussed earlier.

OPERATION—FLASHLAMP ADVANCING

Referring to FIGS. 1, 8, 11 and 12, the exposure mechanism of the invention is depicted in an orientation wherein flash assembly 16 is properly mounted and in position suited for illuminating a photographic field of view somewhat coincident with that photographically witnessed through exposure aperture 152. As seen in connection with FIGS. 1 and 8, loading arm 50 in connection with advancing arm 48 retains engaging flange 204 in a position wherein its return movement edge abuts against pin 240 extending from outer carriage flange 238. The inward camming surface of engaging flange 204 abuts against the next succeeding pin 242 of the four pins extending downwardly from flange 238. Assembly 16 is retained in proper orientation as a result of the presence of engaging flange 204 in abutment against appropriate ones of pins 240–246. During movement of advancing arm 40, a bias will be exerted against a next succeeding pin as at 242 (FIG. 8) to urge movement of the carriages in a clockwise direction.

This bias is resisted by the indexing arrangement including resilient detent or gripping element 278 as engaged within slot 270. As described earlier, loading arm 50 is configured of a resilient material or the like such that it may flex about its mounting at 72. This flexure is used to exert an inward force against both the advancing arm 48 and its attendant engaging flange 204. Note in this regard that advancing arm 48 is not rigidly supported over base plate 60. For instance, it is coupled with loading arm 50 to pin 70 and is slideable over a boss 284 extending from base plate 60.

Looking to FIGS. 11 and 12, where a fresh or totally unfired flash assembly 16 is inserted as shown within the carriage 232–248 assembly, tab 266 will be in a position abutting against step member 264 as shown at 266'. With each succeeding advancement of the dual carriage assembly, the tab will move incrementally from the position at 266' toward the position of opposite abutment against step 264 as illustrated at 266.

Figure 9:
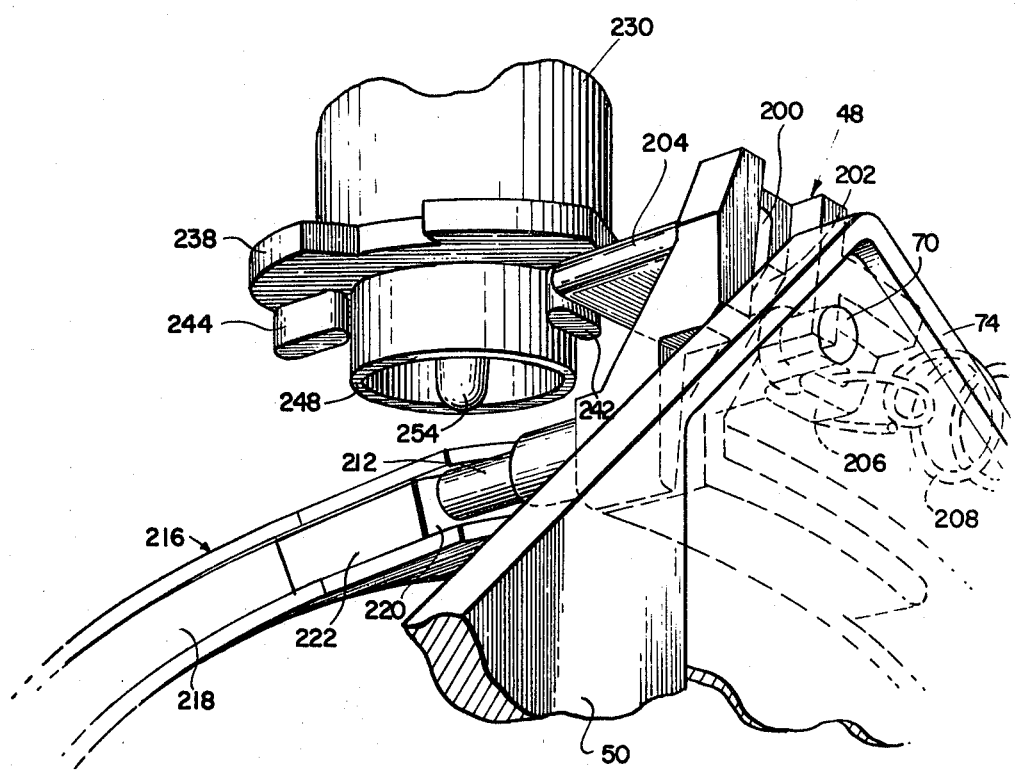
FIG. 9 is a fragmentary pictorial representation of flashlamp assembly advancing components of the exposure mechanism of the invention.

As loading arm 50 and advancing arm 48 are moved from the position shown in FIG. 1 to the position shown in FIG. 7 at the initiation of an exposure cycle, engaging tab 204 will move to the position indicated at 204' in FIG. 8. Note that the flange 204 has moved both laterally and inwardly to a position wherein its returning edge is in abutment with pin 242. Referring additionally to FIG. 9, it will be seen that circular camming pin 212 is moved along arcuate slot 216 during this travel of engaging flange 204 and is urged inwardly from upper level 220 of slot 216 across ramp 222 and into lower level 218. The inward bias providing for appropriate tracking of camming pin 212 during this maneuver is provided from the resiliency of loading arm 50. Additionally during this movement, pin 70, riding within camming slot 200, is maneuvered outwardly up the ramp surface 202 to assure a proper inward pressure into appropriate ones of pins 240–246 and camming pin 212 during its movement along slot 216.

Following its full manual depression and the termination of an exposure interval, shutter release lever 76 is released to permit loading arm 50 to be rotated under the bias of spring 208 into its pre-exposure orientation as shown in FIG. 1. As the arm 50 rotates to this return position, advance arm 48 reverses its earlier described motion while its returning edge cams against pin 242 to cause a counterclockwise rotation of carriage assembly 232–248 and coupled flash assembly 16. A view of engaging flange 204 during this movement is depicted in FIG. 10. Note that as flash assembly 16 reaches a next operative orientation, pin 244 will move into the position earlier occupied by pin 242. Additionally, detent element 278 will ride out of slot 270 until it re-engages slot 272 at a proper orientation of flashlamp assembly 16. With each such rotation, the inner carriage member 248 will move such that its tab approaches the orientation shown at 266 in FIG. 12 and spring 258 will be incrementally loaded. Such orientation is reached following the expenditure of all flashlamps 20 within a unit and, when such position is reached, will prevent the loading arm 50 from returning under the bias of spring 208. Removal of a flashlamp assembly 16 will mechanically uncouple inner carriage 248 from outer carriage 232 to permit rotation of the latter and return of the loading arm 50 to its initial position. Once released from engagement with a flash assembly at 16, inner carriage 248 will return under the bias of spring 258 to a position wherein its tab 266 will assume the position shown at 266' in FIG. 12. With this feature, the exposure mechanism is prevented from operating with an expended flashlamp assembly 16. A further indication of an expended flashlamp may be provided by adjusting the arcuate dimension of tab 266. For instance, should the tab be shortened, the flashlamp 16 will be rotated away from its proper operative position following the expenditure of a fourth or last flashlamp 20.

As may be evidenced from the foregoing, the rotation imparted to flashlamp assembly 16 is derived from the spring forces associated with the operation of a shutter mechanism, as opposed to those derived from a film advance system or the like. As a consequence, the exposure mechanism of the invention enjoys a broader spectrum of photographic application. Further, the spring forces required to achieve indexing are reasonable to permit a fabrication using plastic parts and the like. Another feature of the invention resides in the relatively few number of components utilized for the functions performed. Each of these components is fabricable on using high volume techniques to assure low cost production. Further, it may be noted that four of the five major components of the unit are co-pivotally mounted. For instance, loading arm 50, shutter blade 52, articulated shutter actuator assembly 54 and impact actuator 46 are mounted for rotation about an axis through stud 56.

An advantageous feature of the operation of the exposure mechanism resides in the inability of the apparatus to cause an exposure until shutter release lever 76 is fully depressed. The foregoing discussion revealed that latching member 130 was cammed outwardly from camming flanges 196 and 290 until articulated shutter actuator assembly 54 was rotated to its substantially maximum upward orientation. A failure to fully depress the lever 76 or a subsequent release of the lever from a partially depressed position merely causes lever member 130 to cam rearwardly to its pre-exposure position. This feature prevents an aborted exposure resulting from inadvertent partial depression of lever 76.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An exposure control apparatus for a photographic camera comprising:
    photographic shutter means actuable to establish an exposure interval;
    mounting means for detachably supporting and retaining an assembly of flashlamps;
    firing means actuable to cause the ignition of a flashlamp within said assembly; and
    advancing means movable from a rest to a terminal position in response to the actuation of said shutter means for actuating said firing means during said movement, engageable with said mounting means when in said terminal position and thereafter movable from said terminal to said rest position for sequentially advancing said flashlamps from a predetermined operative position to another position.

2. The exposure control apparatus of claim 1 including:
    means for spring loading said firing means; and
    wherein said advancing means is operative to restrain said spring loaded firing means during a select portion of said movement from said rest toward said terminal position.

3. The exposure control apparatus of claim 1 in which said firing means is engageable with said shutter means for selectively delaying the initiation of said exposure interval to cause flashlamp ignition in synchronization with a select exposure orientation thereof.

4. The exposure control apparatus of claim 1 wherein said firing means comprises:
    an impulse actuator movable under spring bias in response to said advancing means moving to and reaching a select position between said rest and terminal position; and
    a flashlamp igniting probe positioned for contact with said impulse actuator and responsive to contact therewith for movement to enter into igniting engagement with a said flashlamp.

5. The exposure control apparatus of claim 4 wherein said impulse actuator is configured for accelerative movement over a select distance for providing a momentum exchanging contact with said flashlamp igniting probe.

6. An exposure control apparatus for a photographic camera comprising:
    photographic shutter means actuable to establish an exposure interval;
    mounting means configured to detachably support and retain an assembly of flashlamps and including detent means for permitting it to move in one direction providing for the sequential advancing of said flashlamps from a predetermined operative position to another position;
    firing means actuable to cause the ignition of a flashlamp within said assembly; and
    advancing means movable from a rest to a terminal position in response to the actuation of said shutter means for actuating said firing means and including an engaging assembly having a contact surface slidable over said mounting means in a direction opposite said one direction when said advancing means is moved from said rest to said terminal position, said engaging assembly being configured to engage said mounting means when said advancing means is at said terminal position, said advancing means being thereafter movable from said terminal to said rest position for effecting said sequential advancement of said flashlamps.

7. The exposure control apparatus of claim 6 in which said advancing means is configured to flex toward said mounting means when said advancing means is at said terminal position so as to permit said engagement with said mounting means.

8. The exposure control apparatus of claim 6 including spring means coupled with said advancing means and loadable thereby during said movement from said rest toward said terminal position for urging said advancing means to return from said terminal position to said rest position.

9. The exposure control apparatus of claim 6 including loading means for causing said advancing means to move from said rest to said terminal position and for biasing said engaging assembly into engagement with said mounting means.

10. An exposure control mechanism for photographic apparatus comprising:
   means defining an exposure aperture;
   shutter blade means movable to unblock the passage of light through said aperture to initiate an exposure and movable to block said light passage to terminate an exposure;
   actuator means movable from a rest to a spring loaded position for engaging said shutter blade means when in said spring loaded position and moving therewith to said rest position to initiate an exposure;
   mounting means for detachably supporting and retaining an assembly of mechanically ignitable flashlamps;
   firing means actuable to move from an initial position for providing mechanical igniting engagement with a said flashlamp; and
   advancing means movable from a rest toward a terminal position when said actuator means is moved from said rest position for selectively causing the said actuation of said firing means, said advancing means being engageable with said mounting means when at said terminal position and movable from said terminal to said rest position following said exposure termination for sequentially advancing said flashlamps from a predetermined operative position to another position.

11. The exposure control mechanism of claim 10 wherein said actuator means is operative to engage said firing means during said movement from said spring loaded to said rest position for returning said firing means to said initial position.

12. The exposure control mechanism of claim 10 including resilient means coupled between said actuator means and said firing means for spring loading said firing means when said actuator means is moved from said rest to said spring loaded position.

13. The exposure control mechanism of claim 10 including:
   resilient means coupled between said actuator means and said firing means for spring loading said firing means when said actuator means is moved from said rest to said spring loaded position; and
   wherein said advancing means is operative to restrain said firing means in said initial position during said movement from said rest position and to selectively release said firing means for movement under said spring loading to cause said actuation thereof.

14. The exposure control mechanism of claim 10 wherein said firing means is engageable with said actuator means when in said spring loaded position for selectively regulating engagement of said shutter blade means to synchronize the ignition of a said flashlamp with the said initiation of an exposure.

15. An exposure control mechanism for photographic apparatus comprising:
   means defining an exposure aperture;
   shutter blade means movable to unblock the passage of light through said aperture to initiate an exposure and movable to block said light passage to terminate an exposure;
   actuator means movable from a rest to a spring loaded position for engaging said shutter blade means when in said spring loaded position and moving therewith to said rest position to initiate an exposure;
   mounting means for detachably supporting and retaining an assembly of mechanically ignitable flashlamps;
   probe means movable between retracted and extended positions for igniting a said flashlamp;
   impulse actuator means movable from an initial position for contacting said probe means and causing said movement between said retracted and extended positions;
   resilient means for urging said impulse actuator means to move from said initial position; and
   advancing means movable from a rest toward a terminal position when said actuator means is moved from said rest position for effecting a selectively timed said movement of said impulse actuator means from said initial position, and being engagable with said mounting means when at said terminal position and movable from said terminal position to said rest position following said exposure termination for sequentially advancing said flashlamps from a predetermined operative position to another position.

16. An exposure control mechanism for photographic apparatus comprising:
   means defining an exposure aperture;
   shutter blade means movable to unblock the passage of light through said aperture to initiate an exposure and movable to block said light passage to terminate an exposure;
   actuator means movable from a rest to a spring loaded position for engaging said shutter blade means when in said spring loaded position and moving therewith to said rest position to initiate an exposure;
   mounting means for detachably supporting and retaining an assembly of mechanically ignitable flashlamps;
   probe means movable between retracted and extended positions for mechanically igniting a said flashlamp;
   impulse actuator means movable a predetermined distance from an initial position when actuated for striking said probe means and causing said movement from said retracted to said extended position;
   resilient means for urging said impulse actuator means to move from said initial position; and
   advancing means movable from a rest toward a terminal position when said actuator means is moved from said rest position for selectively causing the actuation of said impulse actuator means, said advancing means being engagable with said mounting means when at said terminal position and movable from said terminal to said rest position following said exposure termination for sequentially advancing said flashlamps from a predetermined operative position to another position.

17. The exposure control mechanism of claim 16 in which said resilient means is coupled between said impulse actuator means and said actuator means, and is loadable therebetween when said actuator means is moved from said rest toward said spring loaded position.

18. The exposure control mechanism of claim 16 wherein said impulse actuator means is engageable with said actuator means when said impulse actuator means is in said initial position and said actuator means is in said spring loaded position and is operative to disengage therefrom when moved from said initial position for selectively regulating engagement of said shutter blade means to synchronize an ignition of a said flashlamp with the said initiation of an exposure.

19. An exposure control mechanism for photographic apparatus comprising:
   means defining an exposure aperture;
   shutter blade means movable to unblock the passage of light through said aperture to initiate an exposure and movable to block said light passage to terminate an exposure;
   actuator means movable from a rest to a spring loaded position for engaging said shutter blade means when in said spring loaded position and moving therewith to said rest position to initiate an exposure;
   mounting means for detachably supporting and retaining an assembly of mechanically ignitable flashlamps;
   probe means movable between retracted and extended positions for mechanically igniting a said flashlamp;
   impulse actuator means movable a predetermined distance from an initial position when actuated for percussively contacting said probe means and causing said movement from said retracted to said extended positions, said impulse actuator means being responsive to said actuator means during said movement from said spring loaded to said rest position for returning to said initial position and for causing a corresponding return of said probe means from said extended to said retracted position;
   resilient means for urging said impulse actuator means to move from said initial position; and
   advancing means movable from a rest toward a terminal position when said actuator means is moved from said rest position for selectively causing the actuation of said impulse actuator means, said advancing means being engagable with said mounting means when at said terminal position and movable from said terminal to said rest position following said exposure termination for sequentially advancing said flashlamps from a predetermined operative position to another position.

20. The exposure control mechanism of claim 19 in which said resilient means is coupled between said impulse actuator means and said actuator means, operative to store energy when said actuator means is moved from said rest toward said spring loaded position, and is operative to release said energy into both said impulse actuator means and said actuator means when said impulse actuator means is actuated by said advancing means.

21. The exposure control mechanism of claim 20 including manually actuated loading means coupled with said advancing means for moving said advancing means from said rest to said terminal position.

22. An exposure control apparatus for a photographic camera comprising:
   shutter means actuable to establish an exposure interval;
   mounting means for detachably supporting and retaining an assembly of flashlamps;
   firing means actuable to cause the ignition of a flashlamp within said assembly;
   advancing means movable along a predetermined locus of travel between a rest and a terminal position for actuating said firing means only at a select position along said locus of travel; and
   manually movable loading means engagable with said advancing means and said shutter means for moving said advancing means from said rest position toward said terminal position and for actuating said shutter means during said manual movement by selectively disengaging therefrom.

23. The exposure control apparatus of claim 22 in which said firing means is engagable with said shutter means for selectively delaying the initiation of said exposure interval to cause flashlamp ignition in synchronization with a select exposure orientation thereof.

24. The exposure control apparatus of claim 22 including:
   means for spring loading said firing means; and
   wherein said advancing means is operative to restrain said spring loaded firing means during a select portion of said movement along said predetermined locus of travel from said rest toward said terminal position.

25. The exposure control apparatus of claim 24 wherein said firing means comprises:
   a spring loaded impulse actuator movable in response to said advancing means moving to and reaching said select position along said locus of travel; and
   a flashlamp igniting probe position for contact with said impulse actuator and responsive to contact therewith for movement to enter into igniting engagement with a said flashlamp.

26. The exposure control apparatus of claim 25 wherein said impulse actuator is configured for accelerative movement over a select distance for providing a momentum exchanging contact with said flashlamp igniting probe.

27. The exposure control apparatus of claim 25 in which said impulse actuator is configured to selectively engage with said shutter means to effect a predetermined retardation of the actuation thereof so as to synchronize the ignition of a said flash lamp with the said establishment of an exposure interval.

28. The exposure control apparatus of claim 22 wherein said firing means is actuable from an initial position; and said shutter means includes:
   shutter blade means movable to unblock the passage of light through an exposure aperture to initiate an exposure and movable to block said light passage to terminate an exposure; and
   actuator means movable from a rest to a spring loaded position for engaging said shutter blade means when in said spring loaded position and moving therewith to said rest position to initiate an exposure, said actuator means being operative to engage said firing means during said movement from said spring loaded to said rest position when said exposure aperture is fully unblocked for returning said firing means to said initial position.

* * * * *